(12) United States Patent
Birkbeck et al.

(10) Patent No.: US 11,843,814 B2
(45) Date of Patent: Dec. 12, 2023

(54) BITRATE OPTIMIZATIONS FOR IMMERSIVE MULTIMEDIA STREAMING

(71) Applicant: Google LLC, Mountain View, CA (US)

(72) Inventors: Neil Birkbeck, Santa Cruz, CA (US); Balineedu Adsumilli, Sunnyvale, CA (US); Damien Kelly, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/462,286

(22) Filed: Aug. 31, 2021

(65) Prior Publication Data

US 2021/0392392 A1 Dec. 16, 2021

Related U.S. Application Data

(63) Continuation of application No. 16/613,961, filed as application No. PCT/US2017/065794 on Dec. 12, 2017, now Pat. No. 11,122,314.

(51) Int. Cl.
*H04N 21/2662* (2011.01)
*H04N 21/233* (2011.01)
(Continued)

(52) U.S. Cl.
CPC ....... *H04N 21/2662* (2013.01); *H04N 21/233* (2013.01); *H04N 21/23418* (2013.01); *H04N 21/4728* (2013.01); *H04N 21/816* (2013.01)

(58) Field of Classification Search
CPC ............. H04N 21/2662; H04N 21/816; H04N 21/4728; H04N 21/23418; H04N 21/233
See application file for complete search history.

(56) References Cited

U.S. PATENT DOCUMENTS 8,396,282 B1 * 3/2013 Huber ................. G06V 10/451
382/153
10,178,043 B1 * 1/2019 Ganjam ................ H04L 65/764
(Continued)

FOREIGN PATENT DOCUMENTS

EP 0665693 A2 8/1995

OTHER PUBLICATIONS

De Abreu et al., "Look around you: Saliency maps for omnidirectional images in VR applications", 2017 Ninth International Conference on Quality of Multimedia Experience (QOMEX), IEEE, May 31, 2017, 6 pgs.
(Continued)

*Primary Examiner* — Yassin Alata
(74) *Attorney, Agent, or Firm* — Young Basile Hanlon & MacFarlane, P.C.

(57) ABSTRACT

Signals of an immersive multimedia item are jointly considered for optimizing the quality of experience for the immersive multimedia item. During encoding, portions of available bitrate are allocated to the signals (e.g., a video signal and an audio signal) according to the overall contribution of those signals to the immersive experience for the immersive multimedia item. For example, in the spatial dimension, multimedia signals are processed to determine spatial regions of the immersive multimedia item to render using greater bitrate allocations, such as based on locations of audio content of interest, video content of interest, or both. In another example, in the temporal dimension, multimedia signals are processed in time intervals to adjust allocations of bitrate between the signals based on the relative importance of such signals during those time intervals. Other techniques for bitrate optimizations for immersive multimedia streaming are also described herein.

20 Claims, 10 Drawing Sheets

(51) Int. Cl.
    *H04N 21/234*     (2011.01)
    *H04N 21/4728*    (2011.01)
    *H04N 21/81*      (2011.01)

(56) References Cited

U.S. PATENT DOCUMENTS

| | | | |
|---|---|---|---|
| 2016/0255348 A1* | 9/2016 | Panchagnula | H04N 19/184 375/240.02 |
| 2019/0104324 A1* | 4/2019 | Han | H04N 21/234 |
| 2020/0050884 A1 | 2/2020 | Han et al. | |

OTHER PUBLICATIONS

Zhu et al., "Spatiotemporal visual saliency guided perceptual high efficiency video coding with neural network", Neurocomputing, vol. 275 (Elsevier, Amsterdam, NL), Sep. 8, 2017, pp. 511-522.

Jiro Nakajima et al., "Incorporating Audio Signals into Constructing a Visual Saliency Map", 18th International Conference on Medical Image Computing and Computer-Assisted Intervention—MICCAI 2015 (Springer, Munich, DE) Oct. 28, 2013, pp. 468-480.

Tsuhan Chen et al., "From lip synchronization to joint audio-video coding", IEEE Circuits and Devices Magazine, vol. 11, No. 6 (IEEE, Piscataway, NJ, US), Nov. 1, 1995, pp. 21-26.

International Search Report and Written Opinion of International Application No. PCT/US2017/065794, dated Jun. 8, 2018, 15 pgs.

* cited by examiner

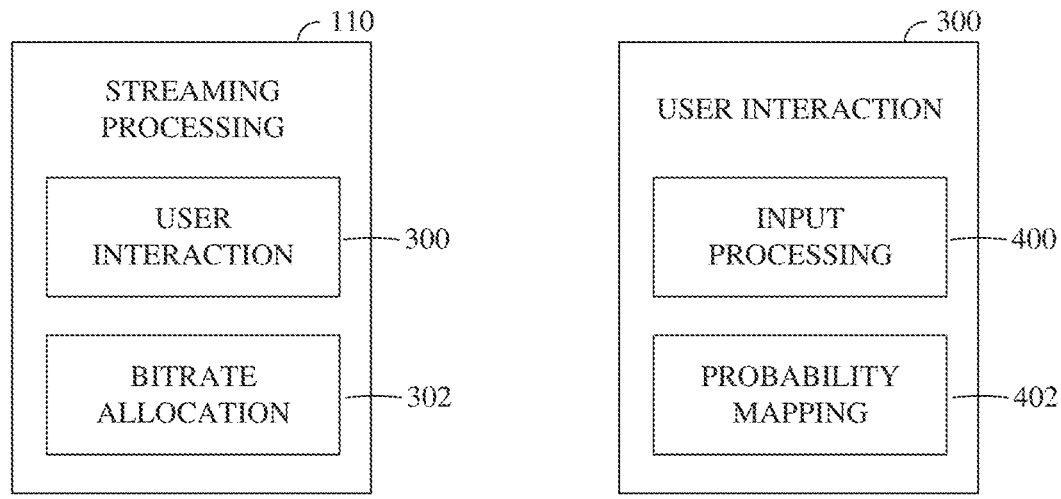
FIG. 3
FIG. 4
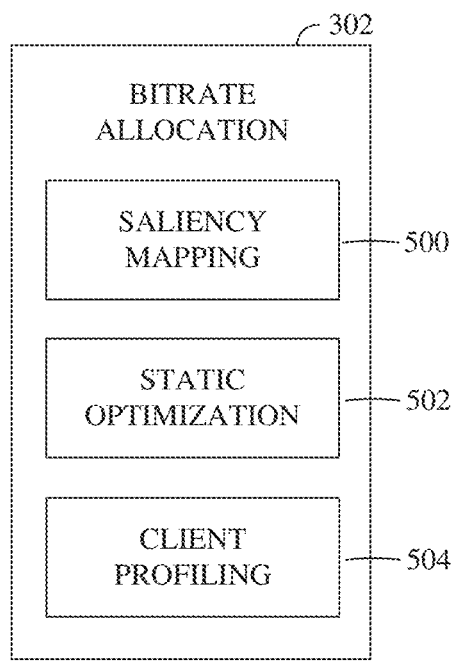
FIG. 5

SPHERICAL VIDEO REPRESENTATION

EQUIRECTANGULAR PROJECTION

SPHERICAL AUDIO REPRESENTATION

AUDIO SALIENCY MAP

VIDEO SALIENCY MAP

FUSED SALIENCY MAP

US 11,843,814 B2

BITRATE OPTIMIZATIONS FOR IMMERSIVE MULTIMEDIA STREAMING

CROSS-REFERENCE TO RELATED APPLICATION

This application is a continuation of U.S. Ser. No. 16/613,961, filed Nov. 15, 2019, and issued as U.S. Pat. No. 11,122,314, on Sep. 14, 2021, which is a 371 of PCT/US2017/065794, filed Dec. 12, 2017, each of which is incorporated in its entirety by reference.

BACKGROUND

Immersive multimedia items (e.g., 360-degree videos, immersive videos, spherical videos, or virtual reality videos) may be streamed over a network from a service provider to a client. The stream can be used for various applications including, for example, immersive video entertainment, immersive video advertisements, sharing of user-generated immersive videos, or the like. An immersive multimedia item stream can contain a large amount of data used to render the immersive multimedia item, which may be encoded by a service provider before being streamed to a client for playback. The amount of data contained in an immersive multimedia item stream and the techniques for encoding, streaming, or otherwise processing or transmitting such data can affect the overall quality of experience (QoE) for the immersive multimedia item.

SUMMARY

A method for adjusting allocations of bitrate between a video signal and an audio signal of an immersive multimedia item according to an implementation of this disclosure comprises producing a video saliency map representing changes in the video signal over a period of time within a spatial region of the immersive multimedia item. The method further comprises producing an audio saliency map representing changes in the audio signal over the period of time within the spatial region. At least one of the changes in the video signal or the changes in the audio signal reflect content of interest. The method further comprises combining at least a portion of the video saliency map and at least a portion of the audio saliency map to produce a fused saliency map. The combining includes adjusting relative weights of the audio saliency map and of the video saliency map. The method further comprises enhancing the content of interest by adjusting the allocations of the bitrate between the video signal and the audio signal according to the fused saliency map.

In some implementations of the method, producing the video saliency map representing the changes in the video signal over the period of time within the spatial region of the immersive multimedia item comprises rendering multiple viewports of the immersive multimedia item, determining saliencies of at least some of the multiple viewports, and aggregating the saliencies within a common parameterization domain. At least some viewports of the multiple viewports correspond to the spatial region. The saliencies reflect changes in video content within the at least some of the multiple viewports.

In some implementations of the method, rendering multiple viewports of the immersive multimedia item comprises selecting the multiple viewports based on statistical data indicating frequently viewed spatial regions of the immersive multimedia item over the period of time.

In some implementations of the method, the method further comprises parameterizing the audio signal in a direction of a spherical representation of the immersive multimedia item to identify changes in loudness of audio content of the immersive multimedia item. The direction corresponds to the spatial region.

In some implementations of the method, producing the audio saliency map representing the changes in the audio signal over the period of time within the spatial region comprises calculating a weighted sum of convolved contributions of power of the parameterized audio signal per audio class and frequency and determining the changes in the audio signal over the period of time based on the weighted sum.

In some implementations of the method, the weighted sum is calculated subsequent to determining that the audio content for which the changes in loudness are identified correspond to a relevant audio class.

In some implementations of the method, combining the at least a portion of the video saliency map and the at least a portion of the audio saliency map to produce the fused saliency map comprises determining a first value by applying first parameters against the video saliency map, determining a second value by applying second parameters against the audio saliency map, determining a third value by applying third parameters against a product of the video saliency map and the audio saliency map, and subsequently combining the first value, the second value, and the third value.

In some implementations of the method, each of the first parameters, the second parameters, and the third parameters includes a linear weight parameter and a non-linear gain parameter.

In some implementations of the method, enhancing the content of interest by adjusting the allocations of the bitrate between the video signal and the audio signal according to the fused saliency map comprises determining whether salient regions of the fused saliency map reflect a greater presence of audio content or of video content. Responsive to determining that the salient regions reflect a greater presence of audio content, enhancing the content of interest further comprises adjusting the allocations of the bitrate by increasing a bitrate allocation for the audio signal and decreasing a bitrate allocation for the video signal over the period of time. Responsive to determining that the salient regions reflect a greater presence of video content, enhancing the content of interest further comprises adjusting the allocations of the bitrate by increasing a bitrate allocation for the video signal and decreasing a bitrate allocation for the audio signal over the period of time.

In some implementations of the method, the method further comprises aggregating data indicative of frequently viewed spatial regions of the immersive multimedia item to produce a probability map indicative of a probable view direction and readjusting the allocations of the bitrate between the video signal and the audio signal according to the probability map.

An apparatus for adjusting allocations of bitrate between a video signal and an audio signal of an immersive multimedia item according to an implementation of this disclosure comprises a memory and a processor. The processor executes instructions stored in the memory to produce a video saliency map representative of changes in the video signal over a period of time within a spatial region of the immersive multimedia item. The processor executes further instructions stored in the memory to produce an audio saliency map representative of changes in the audio signal over the period of time within the spatial region. At least one of the changes in the video signal or the changes in the audio signal reflect content of interest. The processor executes further instructions stored in the memory to combine at least a portion of the video saliency map and at least a portion of the audio saliency map to produce a fused saliency map. The instructions to combine include instructions to adjust relative weights of the audio saliency map and of the video saliency map. The processor executes further instructions stored in the memory to enhance the content of interest by adjusting the allocations of the bitrate between the video signal and the audio signal according to the fused saliency map.

In some implementations of the apparatus, the instructions to produce the video saliency map representative of the changes in the video signal over the period of time within the spatial region of the immersive multimedia item include instructions to render multiple viewports of the immersive multimedia item, determine saliencies of at least some of the multiple viewports, and aggregate the saliencies within a common parameterization domain. At least some viewports of the multiple viewports correspond to the spatial region. The saliencies reflect changes in video content within the at least some of the multiple viewports.

In some implementations of the apparatus, the instructions to render multiple viewports of the immersive multimedia item include instructions to select the multiple viewports based on statistical data indicative of frequently viewed spatial regions of the immersive multimedia item over the period of time.

In some implementations of the apparatus, the instructions include instructions to parameterize the audio signal in a direction of a spherical representation of the immersive multimedia item to identify changes in loudness of audio content of the immersive multimedia item. The direction corresponds to the spatial region.

In some implementations of the apparatus, the instructions to produce the audio saliency map representative of the changes in the audio signal over the period of time within the spatial region include instructions to calculate a weighted sum of convolved contributions of power of the parameterized audio signal per audio class and frequency and determine the changes in the audio signal over the period of time based on the weighted sum.

In some implementations of the apparatus, the weighted sum is calculated subsequent to a determination that the audio content for which the changes in loudness are identified correspond to a relevant audio class.

In some implementations of the apparatus, the instructions to combine the at least a portion of the video saliency map and the at least a portion of the audio saliency map to produce the fused saliency map include instructions to determine a first value by applying first parameters against the audio saliency map, determine a second value by applying second parameters against the video saliency map, determine a third value by applying third parameters against a product of the video saliency map and the audio saliency map, and combine the first value, the second value, and the third value.

In some implementations of the apparatus, each of the first parameters, the second parameters, and the third parameters includes a linear weight parameter and a non-linear gain parameter.

In some implementations of the apparatus, the instructions to enhance the content of interest by adjusting the allocations of the bitrate between the video signal and the audio signal according to the fused saliency map include instructions to determine whether salient regions of the fused saliency map reflect a greater presence of audio content or of video content. Responsive to a determination that the salient regions reflect a greater presence of audio content, the instructions to enhance the content of interest include instructions to adjust the allocations of the bitrate by increasing a bitrate allocation for the audio signal and decreasing a bitrate allocation for the video signal over the period of time. Responsive to a determination that the salient regions reflect a greater presence of video content, the instructions to enhance the content of interest include instructions to adjust the allocations of the bitrate by increasing a bitrate allocation for the video signal and decreasing a bitrate allocation for the audio signal over the period of time.

In some implementations of the apparatus, the instructions include instructions to aggregate data indicative of frequently viewed spatial regions of the immersive multimedia item to produce a probability map indicative of a probable view direction and readjust the allocations of the bitrate between the video signal and the audio signal according to the probability map.

These and other aspects of the present disclosure are disclosed in the following detailed description of the implementations, the appended claims and the accompanying figures.

BRIEF DESCRIPTION OF THE DRAWINGS

The description herein makes reference to the accompanying drawings described below, wherein like reference numerals refer to like parts throughout the several views.

FIG. 3 is a block diagram of an example of a streaming processing mechanism of an immersive multimedia streaming system.

FIG. 4 is a block diagram of an example of a user interaction mechanism.

FIG. 5 is a block diagram of an example of a bitrate allocation mechanism.

DETAILED DESCRIPTION

Figure 1:
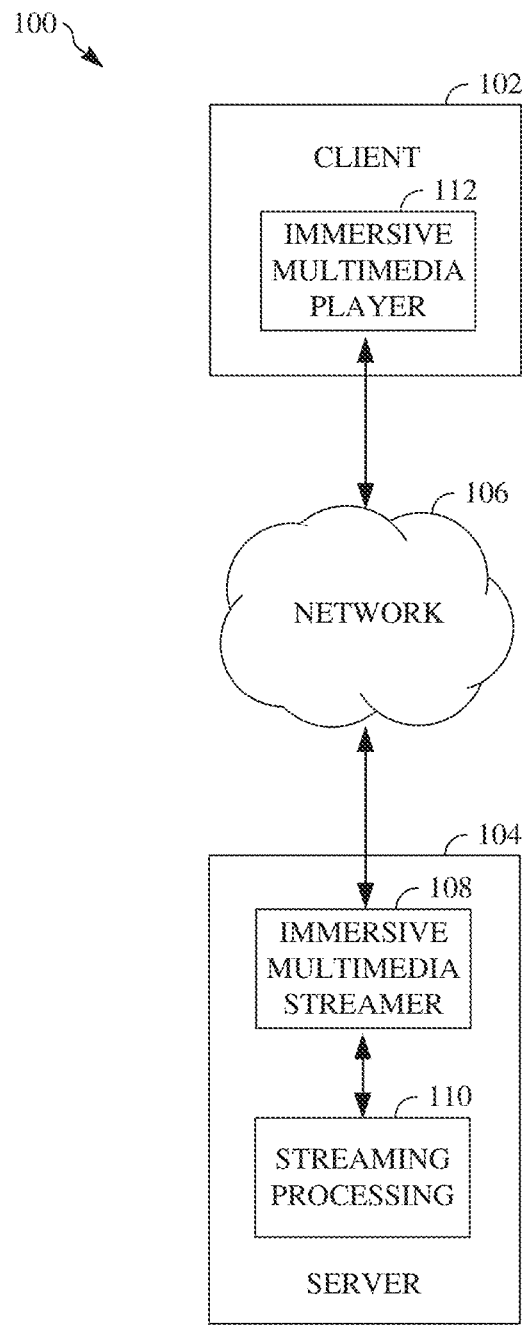
FIG. 1 is a block diagram of an example of an immersive multimedia streaming system including a client and a server.

The QoE for an immersive multimedia item can be dependent upon one or more factors including, for example, the quality of encoded data used to render the immersive multimedia item, network traffic and latencies, or aspects of a playback environment. The overall QoE for an immersive multimedia item is particularly impacted by the quality of the encoded signals (e.g., the video and audio signals) thereof with respect to the distribution of bandwidth available for streaming the immersive multimedia item.

An immersive multimedia item includes multiple media signals that are encoded and streamed. For example, an immersive multimedia item may include a video component for rendering video content during playback of the immersive multimedia item and an audio component for rendering audio content during such playback. The video component and the audio component may respectively be represented in a video signal and an audio signal of the immersive multimedia item. Streaming the immersive multimedia item can thus include transmitting an encoded video signal and an encoded audio signal from a server of a service provider to a client of an end user.

Conditions for streaming an immersive multimedia item (e.g., an amount of available bandwidth) may change over time during the playback of the immersive multimedia item. As such, the settings for encoding the signals of the immersive multimedia item may change. For example, the resolution of a video signal of an immersive multimedia item may at some point be increased where the amount of bandwidth increases. In another example, where there is a bitrate constraint, the video signal may be streamed at a lower resolution.

The various signals of an immersive multimedia item are typically processed independently such that the settings for encoding each of those signals (e.g., the bitrate allocated to each such signal) is determined without regard to the other signals. However, those signals are not always independent, such as where the video content and audio content of an immersive multimedia item are intended to be synchronized. For example, the video content can include a ball falling to the ground and the audio content can include a sound when the ball contacts the ground. Allocating greater bitrate to the video signal to enhance the video of the ball falling causes less bitrate to be available for the audio signal. As such, determining how to allocate bitrate to one signal so as to optimize the QoE for that signal alone may cause a reduction in quality of another signal, which could ultimately reduce the overall QoE for the immersive multimedia item.

For example, a video signal of an immersive multimedia item may be streamed in one of multiple resolutions, for example, 144p, 360p, 480p, 720p, 1080p, 2 k, and 4 k. Corresponding bitrates for those resolutions may, for example, be 150 Kbps, 275 Kbps, 512 Kbps, 1024 Kbps, 6000 Kbps, and 12000 Kbps. An audio signal of an immersive multimedia item may be streamed using a typical two-channel stereo audio transcode having a bitrate of 128 Kbps or an omnidirectional spatial audio modeling technique, for example, having a bitrate of closer to 400 Kbps or more. The audio signal may, therefore, account for a significant portion of the total bitrate for streaming the immersive multimedia item.

Implementations of this disclosure address problems such as these by jointly considering multiple signals (e.g., audio and video signals) of an immersive multimedia item to optimize the QoE for the immersive multimedia item. During the encoding of signals of an immersive multimedia item, portions of available bitrate are allocated to the signals according to the overall contribution of those signals to the immersive experience for the immersive multimedia item. For example, in the spatial dimension, multimedia signals are processed to determine spatial regions of the immersive multimedia item to render using greater bitrate allocations, such as based on locations of audio content of interest, video content of interest, or both. In another example, in the temporal dimension, multimedia signals are processed in time intervals to adjust allocations of bitrate between the signals based on the relative importance of such signals during those time intervals. Other techniques for bitrate optimizations for immersive multimedia streaming are also described herein.

Further details of techniques for bitrate optimizations for immersive multimedia streaming are described herein with initial reference to hardware structures with which the techniques can be implemented. FIG. 1 is a block diagram of an example of an immersive multimedia streaming system 100 including a client 102 and a server 104. The client 102 and the server 104 communicate over a network 106. The client 102, the server 104, and the network 106 can be used for streaming of immersive multimedia items. For example, an immersive multimedia item, such as a three-dimensional (3D) video, virtual reality environment, or the like, can be streamed over the network 106 from the server 104 to the client 102.

The client 102 includes a computing device that enables a user to view, play, or otherwise interact with an immersive multimedia item streamed from the server 104. The computing device of the client 102 may, for example, be a mobile phone, a tablet computer, a laptop computer, a notebook computer, a desktop computer, a virtual reality headset, or another suitable computing device, or a combination thereof. Implementations and examples of a computing device that can be used to implement the client 102 are described below with respect to FIG. 2. However, other implementations of the client 102 are possible. For example, the processing of the client 102 can be distributed among multiple devices.

The server 104 includes a computing device that stores and streams immersive multimedia items, such as to the client 102. The computing device of the server 104 may, for example, be a server computer, such as may be located at a rack in a datacenter. However, the computing device of the server 104 may be a different type of computer, for example, a mobile phone, a tablet computer, a laptop computer, a notebook computer, a desktop computer, or another suitable computing device, or a combination thereof. Implementations and examples of a computing device that can be used to implement the server 104 are described below with respect to FIG. 2. However, other implementations of the server 104 are possible. For example, the processing of the server 104 can be distributed among multiple devices.

The network 106 can be, for example, the Internet. The network 106 can also be a local area network (LAN), wide area network (WAN), virtual private network (VPN), cellular telephone network, or another means of streaming an immersive multimedia item from the server 104 to the client 102. Various protocols may be used for the streaming. For example, a real-time transport protocol (RTP) is used for streaming an immersive multimedia item over the network 106. In another example, a transport protocol other than RTP may be used (e.g., a Hypertext Transfer Protocol-based (HTTP-based) video streaming protocol).

The server 104 includes functionality for streaming an immersive multimedia item to the client 102 over the network 106. For example, the server 104 can include an immersive multimedia streamer mechanism 108 and a streaming processing mechanism 110. The immersive multimedia streamer mechanism 108 accesses data stored in a database accessible from the server 104 to retrieve an immersive multimedia item (e.g., based on a request received from the client 102). Subsequent to retrieving the data, the immersive multimedia streamer mechanism 108 streams the immersive multimedia item to the client 102, such as to an immersive multimedia player mechanism 112 of the client 102. Streaming the immersive multimedia item using the immersive multimedia streamer mechanism 108 can include opening a port of the server 104 for transmitting a signal indicative of the immersive multimedia item.

The immersive multimedia player mechanism 112 is software that receives the streamed immersive multimedia item from the server 104 and outputs the immersive multimedia item for display to a user of the client 102, such as using a display of a computing device of the client 102. The immersive multimedia player mechanism 112 can include functionality for decoding an encoded signal including the immersive multimedia item and processing the decoded signal for playback on a screen of a virtual reality headset, a mobile phone, a tablet computer, or the like. The immersive multimedia player mechanism 112 is also configured to receive user input from a user of the client 102. For example, the user input may reflect an interaction of the user of the client 102 with a portion of the immersive multimedia item, a change in currently rendered viewport of the immersive multimedia item, or the like.

The immersive multimedia player mechanism 112 processes the user input by transmitting data indicative of the user input to the immersive multimedia streamer mechanism 108. The immersive multimedia streamer mechanism 108, which acts as the interface of the server 104 with the immersive multimedia player mechanism 112 of the client 102, then transmits the data indicative of the user input to the streaming processing mechanism 110.

The streaming processing mechanism 110 processes the user input to determine changes to make to the streaming of the immersive multimedia item by the immersive multimedia streamer mechanism 108. For example, the user input can indicate a user preference for viewports in a certain region of the immersive multimedia item. The streaming processing mechanism 110 can use the user input to adjust bitrates for audio and/or video components of the immersive multimedia item to accommodate the user preference, such as to improve the quality of experience associated with the viewports in that certain region.

Implementations of the immersive multimedia streaming system 100 may differ from those described above. In some implementations, the immersive multimedia streamer mechanism 108 and the streaming processing mechanism 110 can be combined into a single software component. In some implementations, the immersive multimedia player mechanism 112 may be a client of the immersive multimedia streamer mechanism 108 of the server 104. For example, the immersive multimedia player mechanism 112 may be a client of the YouTube® platform running in a web browser on a computing device of the client 102. The client of the YouTube® platform can receive instructions from the server 104 (e.g., from the immersive multimedia streamer mechanism 108) to permit the playing of an immersive multimedia item within the client of the YouTube® platform.

Figure 2:
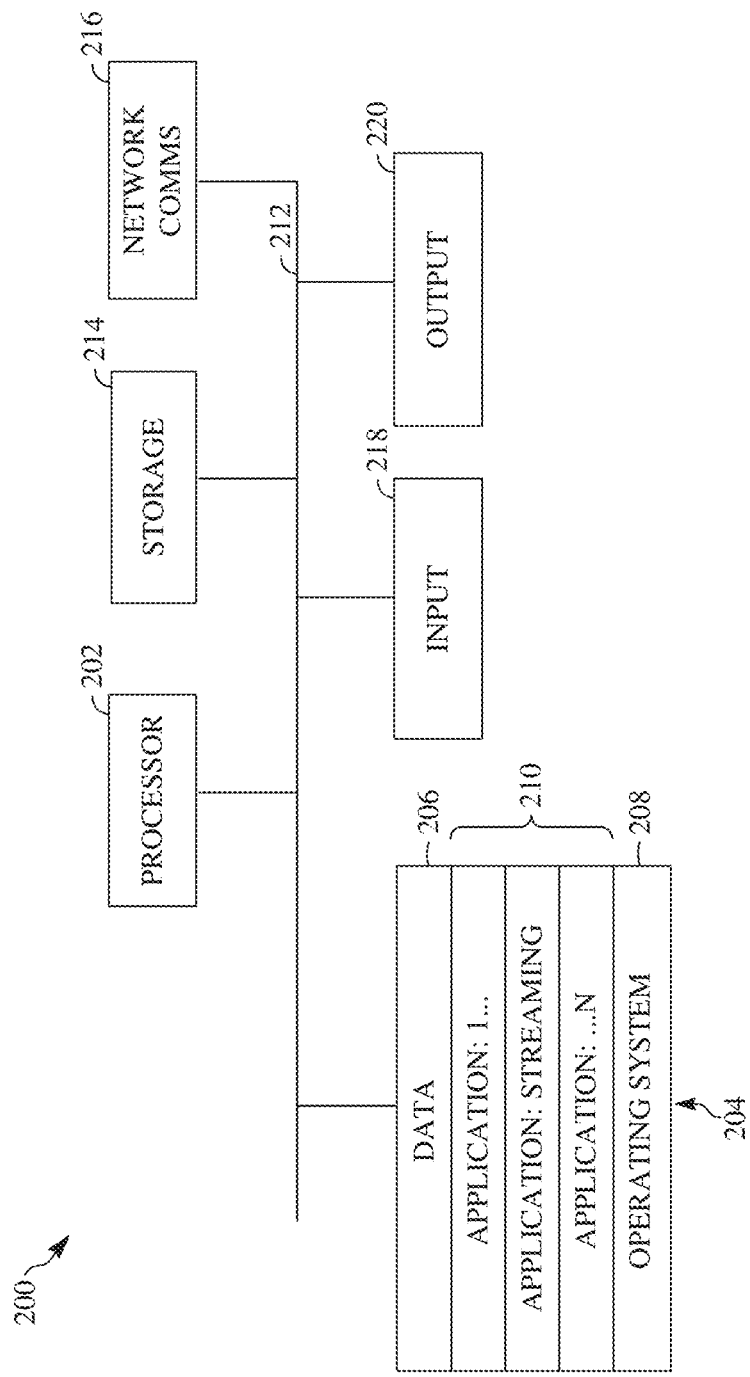
FIG. 2 is a block diagram of an example of a computing device used to implement an immersive multimedia streaming system.

FIG. 2 is a block diagram of an example of a computing device 200 used to implement an immersive multimedia streaming system. For example, the computing device 200 can be a computing device of the client 102 or of the server 104, as each is shown in FIG. 1. As described above, the computing device 200 may be a mobile phone, a tablet computer, a laptop computer, a notebook computer, a desktop computer, a virtual reality headset, or another suitable computing device, or a combination thereof. The computing device 200 includes components for implementing functionality of the immersive multimedia streaming system, such as a processor 202 and a memory 204.

The processor 202 can be a central processing unit (CPU), for example, a microprocessor including one or more processors having single or multiple processing cores. Alternatively, the processor 202 can be another type of device, or multiple devices, now existing or hereafter developed, capable of manipulating or processing information. Although the disclosed implementations can be practiced with one processor as shown (e.g., the processor 202), advantages in speed and efficiency can be achieved by using more than one processor. For example, the processor 202 can include multiple processors interconnected (e.g., hardwired) or networked (e.g., wirelessly networked). In another example, the operations of the processor 202 can be distributed across multiple physical devices coupled directly or indirectly, such as over a local area network or other network.

The memory 204 can be a read-only memory (ROM) device or a random-access memory (RAM) device. For example, the memory 204 can include volatile memory (e.g., one or more DRAM modules, such as DDR SDRAM, SRAM modules, or the like), non-volatile memory (e.g., one or more disk drives, solid state drives, flash memories, Phase-Change Memories (PCMs), or the like), or a combination thereof. However, other suitable types of storage device can be used as the memory 204.

The memory 204 can include code and data 206, an operating system 208, and application programs 210. The application programs 210 include at least one program that permits the processor 202 to perform the techniques described herein. For example, the application programs 210 can include applications 1 through N, which further include an immersive multimedia streaming application used to perform some or all of the techniques described herein. The processor 202 can use a bus 212 to access, manipulate, or otherwise process or execute the data 206, the application programs 210, the operating system 208, or the like, or a combination thereof. The data 206 may be data associated with one or more of the application programs 210, the operating system 208, other user or system data, or the like, or a combination thereof.

The computing device 200 can also include a secondary storage 214. For example, the secondary storage 214 can include a memory card (e.g., an SD, micro SD, or like card), a USB device, or another type of non-volatile memory, such as for expanding a total storage capacity of the computing device 200. For example, the streaming of immersive multimedia may involve a significant amount of information, at least some of which can be stored in the secondary storage 214 and loaded into the memory 204 as needed for processing. The secondary storage 214 may be accessed using the bus 212.

The computing device can also include a network communications component 216. The network communications component 216 can, for example, provide a connection or link to a network (e.g., the network 106 shown in FIG. 1) via a network interface, which can be a wired network interface, such as Ethernet, or a wireless network interface. For example, the computing device 200 can communicate with other devices via the network communications component 216 and the network interface using one or more network protocols (e.g., TCP/IP, Wi-Fi, GPRS, GSM, CDMA, or the like). The network communications component 216 may be accessed using the bus 212.

The computing device 200 can also include one or more input components 218. The input components 218 can include one or more of a positional input component (e.g., a mouse, touchpad, touchscreen, or the like), keyboard, or another input component capable of receiving input or other commands from a user of the computing device 200. The input components 218 may further include devices configured to produce multimedia items. For example, the input components 218 may include an image-sensing component (e.g., a camera), a sound-sensing component (e.g., a microphone), or the like. The input components 218 may be accessed using the bus 212.

The computing device 200 can also include one or more output components 220. The output components 220 can include one or more of a video component (e.g., a display), an audio component (e.g., headphones, speakers, or the like), or the like. The video component can be a liquid crystal display (LCD), a cathode-ray tube (CRT), a light emitting diode (LED) display (e.g., an OLED display), or another suitable display. For example, the video component may be a display of a virtual reality headset, a touchscreen display of a mobile phone (or another touch-sensitive display that combines a display with a touch-sensitive element operable to sense touch inputs), or the like.

The audio component can be one or more components configured to output multichannel sound (e.g., by causing sound to be audible from multiple directions with respect to the user of the computing device 200). For example, the audio component can include headphones configured to output certain sounds to a left ear headphone component and other sounds to a right ear headphone component. In another example, the audio component can include speakers arranged around the computing device 200, such as to the left and right of the video device. The output components 220 may be accessed using the bus 212.

Implementations of the computing device 200 may differ from those described above. In some implementations, the operations of the processor 202 can be distributed across multiple machines (e.g., wherein individual machines can have one or more processors) that can be coupled directly or across a local area or other network. In some implementations, the memory 204 can be distributed across multiple machines, such as a network-based memory or memory in multiple machines performing the operations of the computing device 200. In some implementations, the bus 212 can comprise multiple buses. In some implementations, the secondary storage 214 can be directly coupled to the other components of the computing device 200 or can be accessed via a network and can comprise an integrated unit such as a memory card or multiple units such as multiple memory cards.

FIG. 3 is a block diagram of an example of a streaming processing mechanism 110 of an immersive multimedia streaming system. For example, the streaming processing mechanism 110 can be the streaming processing mechanism of the server 104 shown in FIG. 1. The streaming processing mechanism 110 includes a user interaction mechanism 300 and a bitrate allocation mechanism 302. The user interaction mechanism 300 processes end user interactions with an immersive multimedia item streamed to a client, such as during playback of the immersive multimedia item at the client. The bitrate allocation mechanism 302 adjusts allocations of bitrate between signals of the immersive multimedia item either using data processed by the user interaction mechanism 300 or independently of such data.

Media signals of an immersive multimedia item may be represented by translating data from a spherical representation. For example, where the immersive multimedia item includes a video signal and an audio signal, the video signal can be displayed during playback as a number of pictures stitched together about an origin in the center of the sphere. Separately, the audio signal can be represented during playback in different positions within the sphere, such as based on directions in which sound pressure levels for the audio signal are projected. Examples of video and audio signal representations in a spherical domain are described below with respect to FIG. 9.

The user interaction mechanism 300 receives and processes data indicative of input received from the client to which the immersive multimedia item is streamed. The input may, for example, include viewports of the spherical representation of the immersive multimedia item that were viewed by the end user. A viewport of the spherical representation can refer to a spatial region of the immersive multimedia item, which includes content of one or more signals of the immersive multimedia item. The streaming processing mechanism 110 may, for example, be aware of the viewports that are viewed by end users of clients. The input may also or instead include spatial locations where an end user interacted with the immersive multimedia item, for example, by pointing and clicking with a mouse or other input component (e.g., a finger of the end user, such as where the immersive multimedia item is streamed to a computing device having touch input functionality). Implementations and examples of the user interaction mechanism 300 are described below with respect to FIG. 4.

The bitrate allocation mechanism 302 processes signals of the immersive multimedia item to determine how to adjust allocations of bitrate between those signals. For example, the bitrate allocation mechanism 302 can determine spatial regions of the immersive multimedia item to render using greater bitrate allocations, such as based on locations of audio content of interest, video content of interest, or both. In another example, the bitrate allocation mechanism 302 can adjust allocations of bitrate between the signals based on the relative importance of such signals during time intervals of playback. In yet another example, the bitrate allocation mechanism 302 can scale bitrate allocations according to available bandwidth of a client and preferences configured for use at the client.

The bitrate allocation mechanism 302 can use data processed at the user interaction mechanism 300 to determine how to adjust allocations of bitrate between the signals of an immersive multimedia item. For example, the user interaction mechanism 300 can include viewport-aware processing functionality that indicates a spatial region of the immersive multimedia item being viewed by a user of a client (e.g., based on a direction the user causes to be faced during playback of the immersive multimedia item). The bitrate allocation mechanism 302 can use output of the viewport-aware processing functionality to identify spatial regions for processing. In another example, the user interaction mechanism 300 can process user interactions with an immersive multimedia item to determine probabilities that particular spatial regions will be rendered during playback. The bitrate allocation mechanism 302 can use those probabilities to identify spatial regions for processing. Implementations and examples of the bitrate allocation mechanism 302 are described below with respect to FIG. 5.

In some implementations, an immersive multimedia item may include a signal other than a video signal or an audio signal. For example, an immersive multimedia item may include a haptic feedback signal or other signal for rendering another medium of the immersive multimedia item. The user interaction mechanism 300 can thus include functionality for processing such other signal and user interactions therewith. The bitrate allocation mechanism 302 can thus include functionality for adjusting allocations of bitrates between such other signals (which may or may not include a video signal, an audio signal, or both).

FIG. 4 is a block diagram of an example of a user interaction mechanism 300. For example, the user interaction mechanism 300 can be the user interaction mechanism 300 of the streaming processing mechanism 110 shown in FIG. 3. The user interaction mechanism 300 includes an input processing mechanism 400 and a probability mapping mechanism 402.

The input processing mechanism 400 processes input received from the client to which the immersive multimedia item is streamed to determine viewports of the immersive multimedia item that are viewed using the client. For example, the input processing mechanism 400 can include viewport-aware functionality for detecting the directions of a spherical representation of the immersive multimedia item rendered at the client during a given time interval of playback.

The probability mapping mechanism 402 uses data processed by the input processing mechanism 400 to produce a probability map. The probability map reflects probabilities that a spatial region of the immersive multimedia item are viewed during a given time interval of playback. The probability mapping mechanism 402 can aggregate statistical data from the input processing mechanism 400 until a threshold measurement value is met. For example, in the first instance of an immersive multimedia item being streamed to a client, there may not be data usable to determine the probabilities that spatial regions will be viewed. However, after a large number of instances of the immersive multimedia item being streamed (e.g., after N views of an immersive video), statistical data aggregated from the input processing mechanism 400 can be used to produce a reliable probability map.

The probability map can be output for use by the bitrate allocation mechanism 302 shown in FIGS. 3 and 5, such as to adjust allocations of bitrate based on the probabilities reflected therein. For example, greater allocations of bitrate can be used for spatial regions indicated with high probabilities in the probability map.

FIG. 5 is a block diagram of an example of a bitrate allocation mechanism 302. For example, the bitrate allocation mechanism 302 can be the bitrate allocation mechanism 302 of the streaming processing mechanism 110 shown in FIG. 3. The bitrate allocation mechanism 302 includes functionality for determining how to adjust bitrate allocations, such as to enhance or otherwise improve the QoE for an immersive multimedia item. The bitrate allocation mechanism 302 includes a saliency mapping mechanism 500, a static optimization mechanism 502, and a client profiling mechanism 504.

Reference is first made to the saliency mapping mechanism 500. During playback of an immersive multimedia item, the attention of a user can be guided by one or both of audio or video. Spatial audio can give information about which spatial directions are most likely to be viewed. Similarly, focus of attention models trained to identify regions of the video that are most likely to be viewed (e.g., those including content of interest) can also give information about the direction most likely to be viewed. As such, certain viewing directions of a video signal may be more likely to be observed at different times during playback. Using those likely viewing direction patterns, portions of the audio and video signals corresponding to the portions of the immersive multimedia item to which a user is more likely to pay attention during playback can then be encoded using a greater bitrate.

For example, when jointly considered, if the audio signal lacks salient features in a given spatial region of the immersive multimedia item, directional information cues from the video signal can compensate for the missing saliencies in the audio signal. Similarly, if the video signal lacks salient features in a given spatial region of the immersive multimedia item, audio cues from the audio signal can be used to indicate which spatial regions are more likely to be viewed. This information is used to determine the spatial regions to render using greater bitrate (and, therefore, using more bandwidth). The greater bitrate enhances or otherwise improves the QoE of the respective spatial regions within the immersive multimedia item.

The saliency mapping mechanism 500 jointly processes signals (e.g., an audio signal and a video signal) of an immersive multimedia item to produce a fused saliency map indicating portions of the immersive multimedia item to which a user is more likely to pay attention during playback. The fused saliency map is produced by combining saliency maps produced for individual ones of the signals of the immersive multimedia item. For example, the saliency mapping mechanism 500 can produce an audio saliency map based on an audio signal of the immersive multimedia item and a video saliency map based on a video signal of the immersive multimedia item. The video saliency map and the audio saliency map may thereafter be combined to produce the fused saliency map.

The saliency of the audio signal is related to the loudness of the audio signal within a spatial region of the immersive multimedia item (e.g., at directions of the spherical representation thereof). As such, producing the audio saliency map includes processing the audio signal according to the loudness and changes in loudness of the audio signal. The audio signal is parameterized in a given direction of the spherical representation of the immersive multimedia item, for example, using the parameters ($\Phi$, $\theta$, t), where $\Phi$ and $\theta$ represent the two-dimensional angular location of audio content and t represents a time during playback of the immersive multimedia item at which such audio content is located there.

However, in some cases, certain types of audio content may be less important than others and therefore less relevant for indicating within an audio saliency map. For example, background noise may be less important than speech or music. This may be because a user is less likely to pay attention to background noise than speech or music during playback of an immersive multimedia item. Different types of audio content may be referred to as classes using the parameter c. The frequency band for the audio signal, represented using the parameter $\omega$, is also considered.

An audio saliency map represents the changes in the audio signal of an immersive multimedia item over a given period of time during playback and within a given spatial region of the immersive multimedia item. The audio saliency map is represented using an equirectangular projection of a given direction of a spherical representation of the immersive multimedia item at a given time (e.g., a particular time unit or a time interval) for playback of the immersive multimedia item. The audio saliency map for a given direction and time may be produced by calculating a weighted sum of convolved contributions of audio signal power per class, c, and frequency, ω, using the following equation:

$$g_A(\Phi,\theta,t) = \sum_{c \in C} \sum_{c \in \Omega} w_{\omega,c}(F_{\omega,c} * A(\Phi,\theta,t,\omega,C)) \quad \text{(Equation 1)}$$

where $g_A(\Phi, \theta, t)$ is the audio saliency map for direction ($\Phi$, $\theta$) at time t, $A(\Phi, \theta, t, \omega, c)$ is the power of the audio signal at the direction ($\Phi$, $\theta$) and time t for frequency ω within frequency space Q of class c within class space C, $F_{\omega,c}$ is a frequency- and class-specific convolution kernel, * is the convolution kernel operator, and $w_{\omega,c}$ is the weight controlling the relative strength of the frequency ω and class c to the overall saliency (e.g., so as to downplay the effect of background noise, transient sound, and other unimportant classes).

The saliency of the video signal is related to visual changes in the omnidirectional video aspect of the immersive multimedia item. Producing the video saliency map based on such visual changes includes projecting views of the spherical representation of the immersive multimedia item to a two-dimensional plane, for example, an equirectangular representation of a viewport of the spherical representation. Multiple views of the spherical representation can be projected to produce multiple equirectangular representations, thereby rendering multiple viewports for video saliency processing.

Individual saliency maps can be produced for ones of the rendered viewports. The individual saliency maps are then aggregated into a common parameterization domain. For example, where the individual saliency maps are aggregated into the equirectangular domain, the individual saliency maps can be aggregated into an equirectangular image. A video saliency map represents the changes in the video signal of an immersive multimedia item over a given period of time during playback and within a given spatial region of the immersive multimedia item. The video saliency map is represented using an equirectangular projection of a given direction of a spherical representation of the immersive multimedia item at a given time (e.g., a particular time unit or a time interval) for playback of the immersive multimedia item.

The video saliency map, referred to as $g_V(\Phi, \theta, t)$, is a function of the parameters ($\Phi$, $\theta$, t), where $\Phi$ and $\theta$ represent the two-dimensional angular location of changes in video content indicated by aggregating the individual saliency maps and t represents a time during playback of the immersive multimedia item at which such changes in video content is located there. The video saliency map $g_V(\Phi, \theta, t)$ can be produced using an equation similar to Equation 1, but with respect to the individual saliency maps produced for the ones of the rendered viewports.

Subsequent to producing the video saliency map and the audio saliency map, the audio saliency map, $g_A(\Phi, \theta, t)$, and the video saliency map, $g_V(\Phi, \theta, t)$, are combined to produce a fused saliency map, referred to as $G(\Phi, \theta, t)$. Combining the video saliency map and the audio saliency map to produce the fused saliency map can include using a parameterized model to control the relative strengths of the audio signal corresponding to the audio saliency map and of the video signal corresponding to the video saliency map, such as using the following equation:

$$G(\Phi,\theta,t) = \alpha_A g_A(\Phi,\theta,t)^{\beta_A} + \alpha_V g_V(\Phi,\theta,t)^{\beta_V} + \alpha_{AV}(g_A(\Phi,\theta,t) g_V(\Phi,\theta,t))^{\beta_{AV}} \quad \text{(Equation 2)}$$

where $\alpha_A$, $\alpha_V$, $\alpha_{AV}$, $\beta_A$, $\beta_V$, and $\beta_{AV}$ represent parameters used to adjust the mixing of the audio saliency map and of the video saliency map, such as to control the relative strengths of the saliencies of the audio content and of the video content for direction ($\Phi$, $\theta$) at time t. The parameters $\alpha_A$, $\alpha_V$, $\alpha_{AV}$, $\beta_A$, $\beta_V$, and $\beta_{AV}$ may have default values or be configured, for example, based on aggregated statistical data. Examples of an audio saliency map, a video saliency map, and a fused saliency map are described below with respect to FIG. 10.

The fused saliency map may then be used to adjust allocations of bitrate between the audio and video signals of the immersive multimedia item. For example, the fused saliency map can be processed using video encoding techniques, which can use the fused saliency map to adjust the bitrate allocated to each of the video signal and the audio signal according to the salient regions of the fused saliency map. Similarly, the fused saliency map can be processed using audio encoding techniques, such as for rate distortion optimization.

Reference is next made to the static optimization mechanism 502. Typically, the media aspects of an immersive multimedia item (e.g., video and audio) are separated into sets of representations reflecting different quality measurements, bitrate allocations, resolution levels, or the like, or a combination thereof. This enables a client (e.g., the client 102 shown in FIG. 1) to adapt to different outputs for those media aspects, such as by scaling to different representations based on an amount of bandwidth available to the client.

For example, one representation for a video signal of an immersive multimedia item may reflect a relatively low resolution (e.g., 144p), whereas another representation for the video signal may reflect a relatively high resolution (e.g., 1080p). Selecting the latter representation would cause the playback of the immersive multimedia item with better visuals. However, the client to which the immersive multimedia item is streamed may not have bandwidth sufficient to process the immersive multimedia item at the bitrate associated therewith. As such, the better overall QoE may indicate to select the former representation.

During video playback, representations of a video aspect may be selected to reflect increasing resolution for the video aspect, such as to incrementally improve overall video quality. That is, each successive resolution has the capacity to enable overall better video quality of the immersive multimedia item so long as enough bitrate is available to support such a successive resolution. However, processing the video aspect alone may not result in an optimal overall QoE for the immersive multimedia item. Similarly, processing an audio aspect alone may not result in an optimal overall QoE for the immersive multimedia item.

The static optimization mechanism 502 jointly processes signals (e.g., an audio signal and a video signal) of an immersive multimedia item to select bitrate settings for fixed audio and video representations of the immersive multimedia item that optimizes or at least enhances the overall QoE for the immersive multimedia item. There may be a fixed bitrate available for streaming the immersive multimedia item to a client. The relative proportion of that bitrate that is associated with the individual signals (e.g., the audio signal or the video signal) of the immersive multimedia item to optimize the QoE for the immersive multimedia item may vary depending on the specific content of the immersive multimedia item at different times during playback of the immersive multimedia item.

The static optimization mechanism 502 considers the content of the immersive multimedia item and the amount of bandwidth available to the client to which the immersive multimedia item is streamed for a given time interval, t. The static optimization mechanism 502 uses that information to adjust the allocations of bitrate for the audio signal and the video signal of the immersive multimedia item according to an optimized QoE for the immersive multimedia item. The optimal QoE for the immersive multimedia item is referred to as QoE($a_i$, $v_j$), where $a_i$ and $v_1$ respectively represent the bitrate settings for the audio signal and for the video signal that optimize the QoE for the immersive multimedia item.

The values of $a_i$ and $v_j$ are selected to maximize the overall QoE for the immersive multimedia item. The static optimization mechanism 502 determines QoE($a_i$, $v_1$) by comparing combinations of the individual bitrates that can be allocated to the audio signal and to the video signal against an amount of bandwidth available to the client to which the immersive multimedia item is streamed. As such, a combination of the individual bitrates that can be allocated to the audio signal and to the video signal that exceeds the amount of bandwidth available to the client is not considered by the static optimization mechanism 502. This is because such a combination would cause the overall QoE for the immersive multimedia item to sharply fall off (e.g., due to buffering requirements or the like).

The static optimization mechanism 502 assumes that the amount of bandwidth available to the client to which the immersive multimedia item is streamed will fall within a given bandwidth range, [$b_k$, $b_{k+1}$]. For example, this may in some cases be based on the computing and communication resources available to the client, a geolocation of the client, or a combination thereof. The static optimization mechanism 502 can then determine the possible values of $a_i$ and $v_j$ for determining QoE($a_i$, $v_1$) using the following equation:

$$\{V,A\} = \mathrm{argmax}_{V,A} \Sigma_b Pr[b_k < b_{k+1}]$$
$$\mathrm{max}_{a_i + v_j < \{k+1\}} QoE(a_i, v_j) \quad \text{(Equation 3)}$$

where Pr represents the probability density of bitrates available to clients to which the immersive multimedia item is or other immersive multimedia items are streamed, A represents the set of bitrates available for the audio signal of the immersive multimedia item in which the bitrate for the audio signal at $a_i$ is assumed to be less than the bitrate for the audio signal at $a_{i+1}$, and where V represents the set of bitrates available for the video signal of the immersive multimedia item in which the bitrate for the video signal at $v_1$ is assumed to be less than the bitrate for the video signal at $v_{j+1}$.

As stated above, and assuming no further bitrate limitations for a client to which the immersive multimedia item is streamed, the QoE of a particular audio and video representation is dependent upon the type of audio and video content within the immersive multimedia item. As such, the values of $a_i$ and $v_j$ are selected based on the particular audio and video content present during time interval t of the immersive multimedia item. The subjective quality of the audio and video content present during time interval t can be assumed to follow a poly-log model related to a reference-based objective quality metric. As such, the values of $a_i$ and $v_j$ for the time interval t can be representative of values along rate-distortion curves for A and V. Such rate-distortion curves may be reflective of a parameterization, such as that shown in the following equation:

$$f(x) = a \log(x+b)^c + d \quad \text{(Equation 4)}$$

and the joint QoE for a given audio and video representation may thus be modeled using a simple parametric form, such as that shown in the following equation:

$$f(x,y) = c_1 \log(x+c_2)^{c_3} + c_4 \log(x+c_5)^{c_6} c_7$$
$$\log(x^{c_8} + c_9 y^{c_{10}})^{c_{11}} + c_{12} \quad \text{(Equation 5)}$$

where the coefficients $c = (c_1, c_2, \ldots, c_{12})$ represent parameters dependent upon the particular audio content and video content of the immersive multimedia item during time interval t, f(x, y) is a function of the coefficients c, and the coefficients c are determined based on empirical estimation for the immersive multimedia item (e.g., by fitting samples for different values of (x, y)). For example, given enough samples over time, the coefficients c can be learned as a regression of audio content and video content of the immersive multimedia item. Examples of differences in overall QoE based on fixed bitrate allocation changes are described below with respect to FIG. 11. The model referenced in Equation 4 and Equation 5 is one possible solution for jointly considering multiple signals (e.g., an audio signal and a video signal) of an immersive multimedia item for processing static optimizations of bitrate allocations. Other solutions are also possible.

Reference is next made to the client profiling mechanism 504. As described above, the bitrate allocation mechanism 302 includes functionality for determining bitrate optimizations for immersive multimedia streaming. However, in some cases, the allocations of bitrate between signals of an immersive multimedia item may be adjusted according to a client profile. For example, a user of a client to which the immersive multimedia item is streamed may define a client profile to reflect his or her preferences for skewing quality in favor or audio content, video content, or both.

The client profiling mechanism 504 jointly processes signals (e.g., an audio signal and a video signal) of an immersive multimedia item based on a client profile defined at the client-side, such as by adjusting allocations of bitrate between those signals based on the configurations indicated within the client profile. The configurations indicated within the client profile reflect whether greater amounts of bitrate should be allocated to a video signal or to an audio signal, or other configurable bitrate allocations, as the case may be.

A user of the client selects a pair of audio and video representations, referred to as ($A_{i,t}$, $V_{j,t}$). The client profiling mechanism 504 uses ($A_{i,t}$, $V_{j,t}$) to determine bitrates that can be allocated for the audio signal and the video signal. For example, the client profiling mechanism 504 processes bitrate candidates to determine that a total combined bitrate therefor, referred to as $a_{i,t} + v_{j,t}$, does not exceed a threshold value. The threshold value may, for example, be defined based on an amount of bandwidth available to the client. Thus, with multiple audio and video representations, there may be several combinations of audio bitrate and video bitrate allocations that are available for use with the client.

For a given time interval t, the estimated QoE for given audio and video bitrate allocations $a_i$ and $v_j$ may be determined and, as the case may be, made available to the client. For example, the client profiling mechanism 504 can determine a tuple in the form of a matrix of $q_{ij} = QoE(a_i, v_1)$ for the possible bitrates associated with the selected ($A_{i,t}$, $V_{j,t}$). In another example, the client profiling mechanism 504 can estimate the QoE individually for the audio signal and for the video signal. One or both of the matrix $q_{ij}$ or the individually-estimated QoE values may be made available to the client.

The bitrate allocation mechanism 302 (e.g., using the client profiling mechanism 504 or another mechanism) may receive a selection from the client based on the information made available to the client by the client profiling mechanism 504. The received selection indicates the configurations of the client profile. For example, the client profile can be configured as shown in the following equation:

$$\mathrm{ClientQoE}(a_i, v_j) = QoE(a_i, v_1) + \gamma_A QoE(a_i) + \gamma_V QoE(v_j) \quad \text{(Equation 6)}$$

where $\gamma_A$ and $\gamma_V$ represent parameters used to adjust the client preferences for audio quality and video quality, respectively, such as to control the relative strengths of the audio signal and of the video signal for the immersive multimedia item during time interval t, and ClientQoE($a_i$, $v_1$) represents one or more audio and video representations that may be selected in accordance with the client profile. For example, the audio and video representation that maximizes the overall QoE for the immersive multimedia item can be selected.

In some implementations, the saliency mapping mechanism 500 may only be used while statistics indicative of user interaction with an immersive multimedia item are being aggregated. For example, the statistics indicative of the user interaction may reflect the directions within the spherical representation of the immersive multimedia item to which users are more likely to pay attention at particular times during playback of the immersive multimedia item. As described above with respect to FIG. 4, a probability map can be produced over time by aggregating data indicative of such statistics. The probability map may then be used to supplement or replace the fused saliency map.

However, in some implementations, the bitrate allocation mechanism 302 (e.g., as part of the saliency mapping mechanism 500 or another mechanism) can compare spatial regions indicated with high probabilities in the probability map against spatial regions rendered using greater bitrate allocations. For example, a spatial region indicated with a high probability in the probability map may reflect that such spatial region is commonly viewed at clients to which the immersive multimedia item is streamed. However, such spatial region may be commonly viewed because it is already rendered at a high quality (e.g., because a greater bitrate is already allocated for rendering such spatial region). In such a case, the high probability is not used to adjust bitrate allocation for the spatial region.

In some implementations, the static optimization mechanism 502 can use brute force processing to determine QoE($a_i$, $v_1$), such as where the numbers of bitrates in A and in V are relatively small. For example, assume there are m bitrate values in A and n bitrate values in V. With k candidate bitrates for each audio and video representation, the total complexity for brute force processing is $k^{m+n}$.

In some implementations, the definitions for the client profile can be extended to consider further configurations. For example, instead of determining bitrate allocations based on just the overall QoE and the user preferences for favoring audio, video, or both, the client profile can in whole or in part be defined based on specific types of multimedia content.

Figure 6:
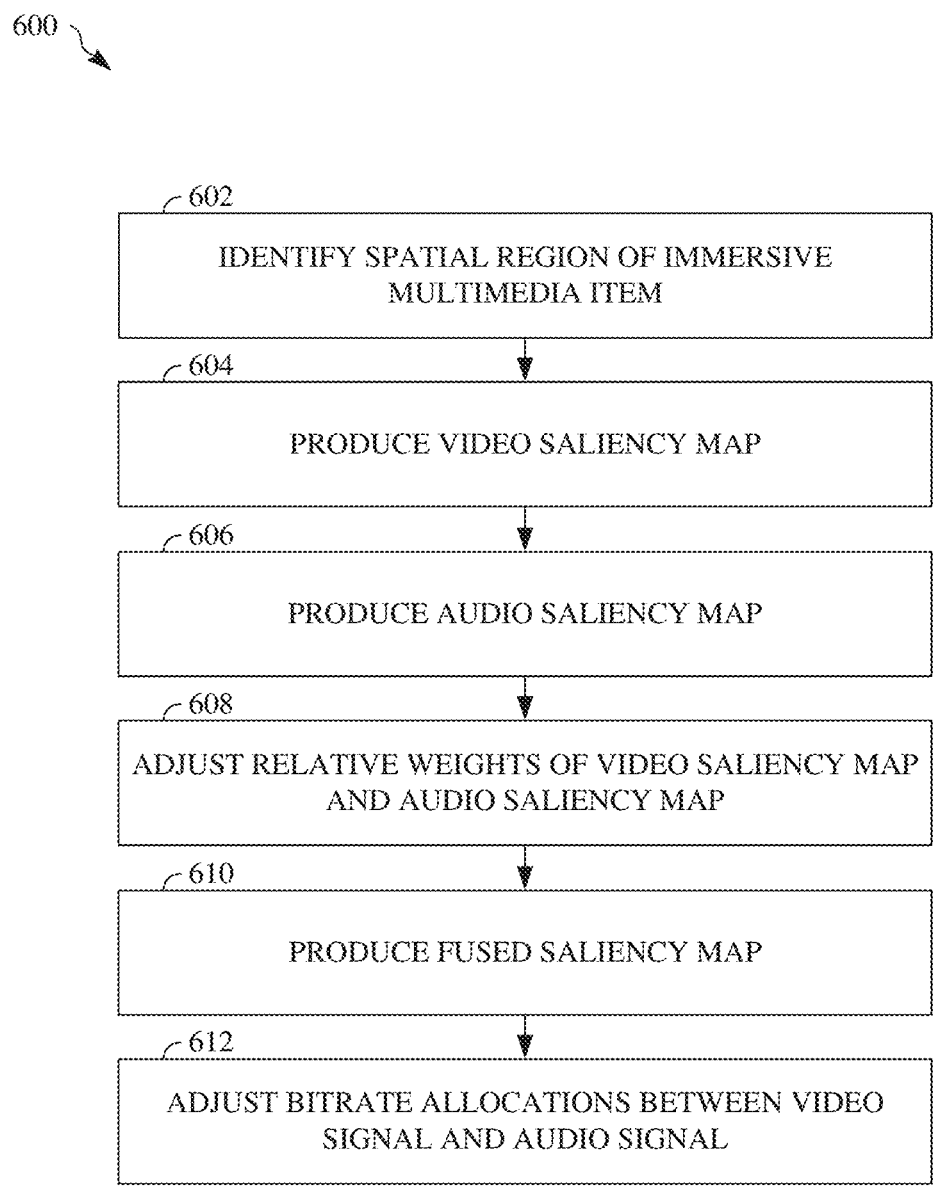
FIG. 6 is a flowchart diagram of an example of a technique for adjusting allocations of bitrate for signals of an immersive multimedia item using a fused saliency map.
Figure 7:
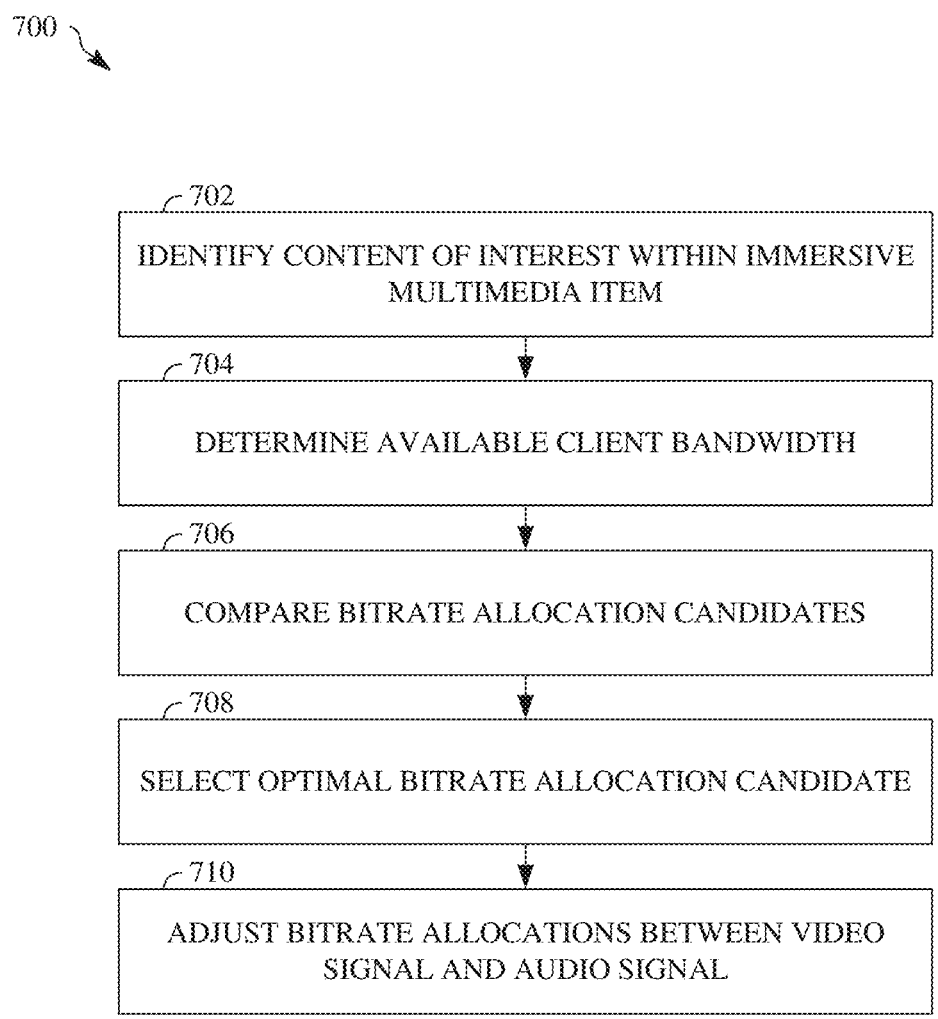
FIG. 7 is a flowchart diagram of an example of a technique for adjusting allocations of bitrate for signals of an immersive multimedia item based on static representations of the signals.
Figure 8:
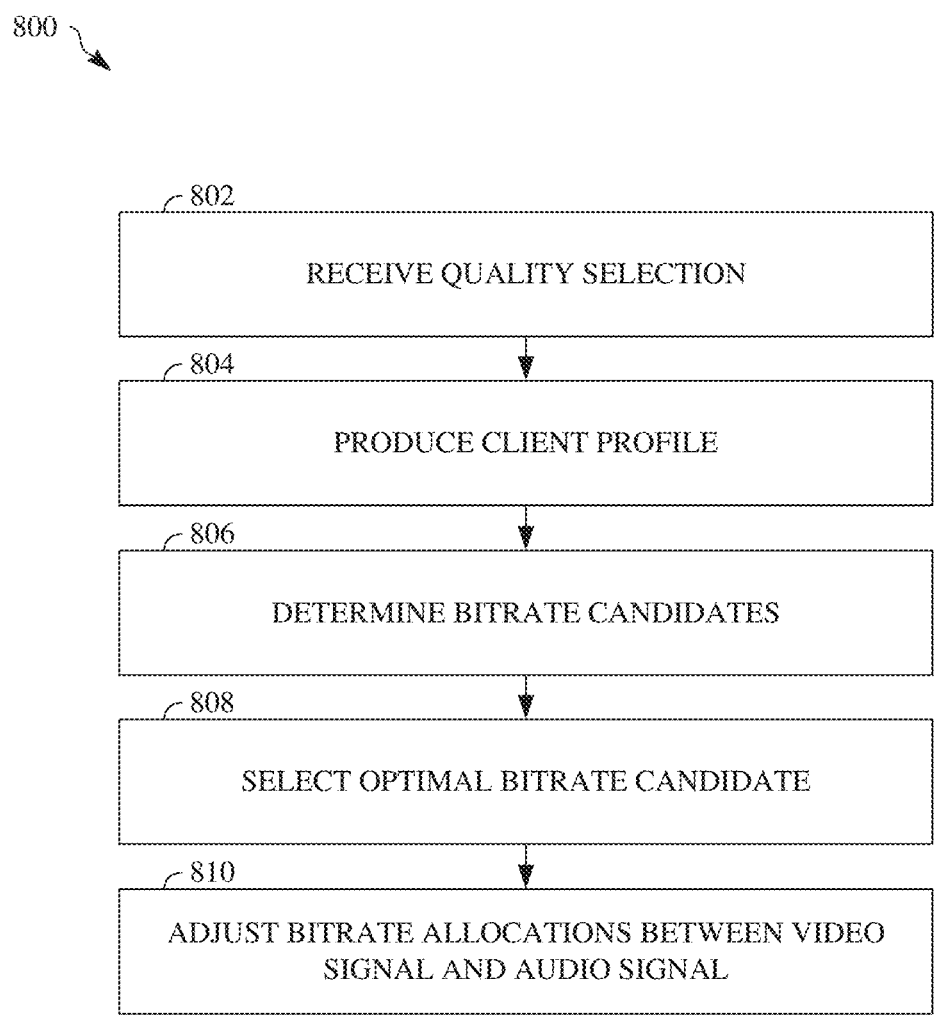
FIG. 8 is a flowchart diagram of an example of a technique for adjusting allocations of bitrate for signals of an immersive multimedia item based on user configurations.

Techniques for bitrate optimizations for immersive multimedia streaming are now described with respect to FIGS. 6-8. FIG. 6 is a flowchart diagram of an example of a technique 600 for adjusting allocations of bitrate for signals of an immersive multimedia item using a fused saliency map. FIG. 7 is a flowchart diagram of an example of a technique 700 for adjusting allocations of bitrate for signals of an immersive multimedia item based on static representations of the signals. FIG. 8 is a flowchart diagram of an example of a technique 800 for adjusting allocations of bitrate for signals of an immersive multimedia item based on user configurations.

One or more of the technique 600, the technique 700, or the technique 800 can be implemented, for example, as a software program that may be executed by computing devices such as the server 104 shown in FIG. 1. For example, the software program can include machine-readable instructions that may be stored in a memory, such as the memory 204 or the secondary storage 214 of the computing device 200 shown in FIG. 2, and that, when executed by a processor, such as the processor 202, may cause the computing device to perform one or more of the technique 600, the technique 700, or the technique 800. For example, the technique 600 can be performed using the saliency mapping mechanism 500 shown in FIG. 5. In another example, the technique 700 can be performed using the static optimization mechanism 502 shown in FIG. 5. In yet another example, the technique 800 can be performed using the client profiling mechanism 504 shown in FIG. 5.

Alternatively, one or more of the technique 600, the technique 700, or the technique 800 can be implemented using specialized hardware or firmware. For example, a client or server, such as the client 102 or the server 104 shown in FIG. 1, may include an application-specific integrated circuit (ASIC) programmed to perform some or all of the operations of one or more of the technique 600, the technique 700, or the technique 800. As explained above, some computing devices may have multiple memories or processors, and the operations described with respect to the technique 600, the technique 700, and the technique 800 can be distributed using multiple processors, memories, or both.

For simplicity of explanation, the technique 600, the technique 700, and the technique 800 are each depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 6, a technique 600 for adjusting allocations of bitrate for signals of an immersive multimedia item using a fused saliency map is shown. At 602, a spatial region of an immersive multimedia item is identified. The spatial region can include content corresponding to one or more signals of the immersive multimedia item. For example, the immersive multimedia item can include a video signal and an audio signal. The spatial region can thus include video content, audio content, or both (or, in some cases, neither). As will be described below, the content within the spatial region may be content of interest, such as where it reflects or is otherwise indicative of changes in the respective signal that could merit the attention of an end user of a client streaming the immersive multimedia item.

The spatial region can be identified using viewport-aware streaming processing. For example, identifying the spatial region can include processing data indicative of viewports rendered at a client to which the immersive multimedia item is streamed. The immersive multimedia stream can begin within the client facing a particular direction of origin. Based on input received at the client (e.g., the end user thereof clicking a mouse or dragging a finger or stylus across a touch screen), the client may face a different direction. The change in direction causes a new viewport to be rendered. Data indicative of the new direction can be communicated to the server from which the immersive multimedia item is streamed.

Alternatively, the spatial region can be identified based on statistical viewing data. For example, statistical data indicating the viewing directions of end users of clients to which the immersive multimedia item is streamed can be aggregated over time to determine the most probable spatial region that will be rendered at a client during a given time interval. This statistical data may be driven based on the video content, the audio content, or both of the immersive multimedia item.

At 604, a video saliency map is produced. The video saliency map represents changes in the video signal over a period of time within the identified spatial region of the immersive multimedia item. Producing the video saliency map can include rendering multiple viewports of the immersive multimedia item. For example, one or more viewports may correspond to the spatial region identified above. That is, the particular portion of the video signal output for display at the client at a given time during playback may not reflect the exact boundaries of a viewport. Two or more viewports may thus be rendered, such as by pulling data indicative of the video content for those two or more viewports from the server that streams the immersive multimedia item.

In some cases, rendering the viewports can include selecting, identifying, or otherwise determining multiple viewports to render based on statistical data indicating frequently viewed spatial regions of the immersive multimedia item, such as over the period of time for which the video saliency map is to be produced. Subsequent to rendering the viewports, saliencies are determined for at least some of the rendered viewports. The saliencies reflect changes in video content within the respective viewports. The saliences are then aggregated within a common parameterization domain to produce the video saliency map. For example, the common parameterization domain may be an equirectangular projection of the spatial region. In effect, the aggregated saliencies are a function of two-dimensional angles that match from a range of the spherical representation of the immersive multimedia item over the period of time.

At 606, an audio saliency map is produced. The audio saliency map represents changes in the audio signal within the identified spatial region over the same period of time as the changes in the video signal described above. Producing the audio saliency map can include parameterizing the audio signal in a direction of a spherical representation of the immersive multimedia item to identify changes in loudness of audio content of the immersive multimedia item. For example, the audio signal can include spatial audio content indicating a direction of sound pressure within the spherical representation. That direction corresponds to the spatial region identified above.

After the audio signal is parameterized, a weighted sum of convolved contributions of power of the parameterized audio signal is calculated per audio class and frequency. The changes in the audio signal over the period of time, which will be indicated within the audio saliency map, are then determined based on the weighted sum. For example, the audio saliency map for a given direction and time may be produced by calculating a weighted sum of convolved contributions of audio signal power per class and frequency. The direction of the spatial audio reflected in the audio saliency map can correspond to the multiple viewports rendered for the video signal, such as based on the particular viewport or viewports rendered at the client. Alternatively, the direction of the spatial audio may reflect different directions, such as where a change in the audio signal occurs in a direction that the end user of the client is not facing.

The weighted sum can be calculated to reflect all changes in loudness within the audio signal. Alternatively, the weighted sum can be calculated subsequent to determining that the audio content for which the changes in loudness are identified correspond to a relevant audio class. That is, audio content of certain audio classes may be less relevant for indicating in the audio saliency map than others. For example, background noise may be less important than speech, music, or other sounds (e.g., non-background noises). The weighted sum may be calculated with respect to changes for the relevant audio classes, but not with respect to changes for the irrelevant audio classes.

At 608, relative weights of the video saliency map and of the audio saliency map are adjusted. Adjusting the relative weights can include using a parameterized model to control the relative strengths of the audio signal corresponding to the audio saliency map and of the video signal corresponding to the video saliency map. For example, a first value can be determined by applying first parameters against the video saliency map. A second value can be determined by applying second parameters against the audio saliency map. A third value can be determined by applying third parameters against a product of the video saliency map and the audio saliency map. The first, second, and third parameters may reflect the same or different values. The first, second, and third parameters may reflect the same or different types of parameters. For example, each of the first parameters, the second parameters, and the third parameters can include a linear weight parameter and a non-linear gain parameter.

At 610, a fused saliency map is produced. Producing the fused saliency map includes combining at least a portion of the video saliency map and at least a portion of the audio saliency map. For example, the first value, the second value, and the third value described above can be combined to produce the fused saliency map. Combining the first value, the second value, and the third value can include adding the first value, the second value, and the third value together such that the fused saliency map can be represented as the sum of the parameterized video and audio saliency maps.

At 612, bitrate allocations between the video signal and the audio signal are adjusted according to the fused saliency map. Adjusting the bitrate allocations between the video signal and the audio signal according to the fused saliency map includes determining whether salient regions of the fused saliency map reflect a greater presence of audio content or of video content. For example, responsive to determining that the salient regions reflect a greater presence of audio content, the allocations of the bitrate can be adjusted by increasing a bitrate allocation for the audio signal and decreasing a bitrate allocation for the video signal over the period of time for which the video and audio saliency maps were produced. In another example, responsive to determining that the salient regions reflect a greater presence of video content, the allocations of the bitrate can be adjusted by increasing a bitrate allocation for the video signal and decreasing a bitrate allocation for the audio signal over that period of time. The content of interest within the video signal, the audio signal, or both (e.g., the changes in the video signal and/or audio signal indicated in the fused saliency map) is thus enhanced by the bitrate allocation adjustment.

Some or all of the operations of the technique 600 can be repeated, such as to understand fused saliencies for multiple spatial regions of an immersive multimedia item. For example, the operations for producing a video saliency map, producing an audio saliency map, adjusting relative weights of the video and audio saliency maps, and producing a fused saliency map can be repeated for some or all spatial regions identified within the immersive multimedia item. For example, video and audio saliency maps can be produced for each spatial region corresponding to a viewport viewed at a client during a time interval. After the expiration of the time interval, the bitrate allocations between the video and audio signals can be adjusted based on those video and audio saliency maps.

In some implementations, the operations for identifying the spatial region of the immersive multimedia item may not be separate from the operations for producing the video saliency map, the operations for producing the audio saliency map, or both. For example, the spatial region can be identified as part of the operations for producing the video saliency map.

In some implementations, the operations for adjusting the relative weights of the video saliency map and of the audio saliency map may not be separate from the operations for producing the fused saliency map. For example, the operations for producing the fused saliency map can include the operations for adjusting the relative weights of the video saliency map and of the audio saliency map.

In some implementations, the audio saliency map can be produced before the video saliency map is produced. In some implementations, such as where parallel processing is available, the audio saliency map and the video saliency map can be simultaneously produced.

In some implementations, the technique 600 can include aggregating data indicative of frequently viewed spatial regions of the immersive multimedia item to produce a probability map indicative of a probable view direction and readjusting the allocations of the bitrate between the video signal and the audio signal according to the probability map. For example, over time and with multiple streams of the immersive multimedia item, statistical data indicating where end users of clients typically focus attention within the immersive multimedia item is aggregated to reflect probabilities for spatial regions of the immersive multimedia item. Those probabilities can be used to supplement or replace the saliency map production operations described above, such as to indicate the immersive multimedia item signals to which to allocate greater bitrate either generally or for a given time interval during playback.

Referring next to FIG. 7, a technique 700 for adjusting allocations of bitrate for signals of an immersive multimedia item based on static representations of the signals is shown. At 702, content of interest is identified within an immersive multimedia item. The content of interest may reflect content of one or more signals of the immersive multimedia item. For example, where the immersive multimedia item includes a video signal and an audio signal, the content of interest may reflect video content, audio content, or both. The content of interest is identified during a time interval of the immersive multimedia item. Identifying the content of interest can include processing the video signal and the audio signal over the time interval or otherwise determining the video content within the video signal and the audio content within the audio signal over the time interval, such as based on statistical information about the video signal, the audio signal, or both.

At 704, an amount of bandwidth available to a client streaming the immersive multimedia item is determined. The amount of bandwidth available to the client can be determined, for example, by examining network traffic information established between the client and a server from which the immersive multimedia item is streamed. Alternatively, the amount of bandwidth can be determined based on statistical information. For example, the statistical information can indicate an average amount of bandwidth available to clients to which the immersive multimedia item can be streamed.

At 706, bitrate allocation candidates are compared. A bitrate allocation candidate refers to a representation of the signals of the immersive multimedia item. For example, a streaming service provider may make available several different representations of the signals of the immersive multimedia item. Each of the different representations can reflect a different bitrate allocation between those signals, a different quality measurement for each of those signals, a different resolution or channel number for each of those signals, or the like, or a combination thereof. There may be a number of bitrate allocation candidates available for encoding the immersive multimedia item, such as during the subject time interval or otherwise.

Comparing the bitrate allocation candidates includes determining which of the bitrate allocation candidates are available based on one or both of the content of interest or the amount of bandwidth available to a client to which the immersive multimedia item may later be streamed. For example, certain ones of the bitrate allocation candidates may reflect allocations of bitrate that cannot be supported based on the amount of available bandwidth. This may be because the overall quality of the content of interest at the bitrates corresponding to those certain bitrate allocation candidates may be too high for the amount of available bandwidth to support (e.g., by causing one or more instances of buffering). In some cases, determining that a bitrate allocation candidate is not available can include removing the bitrate allocation candidate from a list of bitrate allocation candidates.

At 708, an optimal bitrate allocation candidate is selected. Selecting the optimal bitrate allocation candidate includes selecting the one of the available bitrate allocation candidates that maximizes an overall QoE for the immersive multimedia item. For example, selecting the optimal bitrate allocation candidate can include performing a rate-distortion analysis against ones of the bitrate allocation candidates used for encoding the signals of the immersive multimedia item during the subject time interval. The one of the available bitrate allocation candidates having the best score from the rate-distortion analysis can be selected as the optimal bitrate allocation candidate.

At 710, bitrate allocations between the video signal and the audio signal are adjusted according to the selected bitrate allocation candidate. Adjusting the bitrate allocations between the video signal and the audio signal according to the selected bitrate allocation candidate includes setting a bitrate value for the video signal to a video bitrate value reflected in the representation of the selected bitrate allocation candidate and setting a bitrate value for the audio signal to an audio bitrate value reflected in the representation of the selected bitrate allocation candidate.

Some or all of the operations of the technique 700 can be repeated, such as for some or all time intervals of the immersive multimedia item, and such as to encode content of interest present in one or more of those time intervals before streaming an immersive multimedia item to a client. For example, the time intervals may be defined by default, adjusted based on statistical data received from clients to which the immersive multimedia item is streamed, or otherwise configured. In some cases, the content of interest in each time interval may be different so as to merit readjusting the bitrate allocations between the signals of the immersive multimedia item for each time interval or otherwise on a time interval basis.

In some implementations, the bitrate allocation candidates available for selection may be global. For example, each of those bitrate allocation candidates may be available for streaming the immersive multimedia item to all possible clients. In some implementations, the bitrate allocation candidates available for selection may be specific to a particular client, such as based on the computing or communication resources available to that client, based on a geolocation of that client, or a combination thereof.

Referring next to FIG. 8, a technique 800 for adjusting allocations of bitrate for signals of an immersive multimedia item based on user configurations is shown. At 802, a quality selection is received. The quality selection includes data indicating preferences of a user of a client to which the immersive multimedia item is or can be streamed. The quality selection can reflect that such user prefers higher video quality over audio quality, such that greater bitrate should be allocated to a video signal than to an audio signal. Alternatively, the quality selection can reflect a higher preference for audio quality over video quality, or no preference.

At 804, a client profile is produced. The client profile is a record reflecting the quality selection received from the client. The client profile can be stored in a database or like data store accessible to the server that streams the immersive multimedia item to the client.

At 806, bitrate candidates are determined. Determining the bitrate candidates includes determining the representations of the signals that meet the preferences stated in the client profile. For example, when a request to stream the immersive multimedia item is received from the client, a record corresponding to the client profile can be queried to indicate the preferences to use to stream the immersive multimedia item. Based on those preferences, some or all of the available representations of the immersive multimedia item may be made available as candidates. For example, where the client profile reflects a user preference for video quality over audio quality, the bitrate candidates may omit representations where greater bitrate is allocated to the audio signal of the immersive multimedia item.

At 808, an optimal bitrate candidate is selected. Selecting the optimal bitrate candidate includes estimating overall QoE values for streaming the immersive multimedia item based on the different combinations of bitrate allocations reflected by the available bitrate candidates. For example, the optimal bitrate candidate can be selected using the same or similar operations as described above with respect to the technique 700 shown in FIG. 7.

At 810, bitrate allocations between the video signal and the audio signal are adjusted according to the selected bitrate candidate. Adjusting the bitrate allocations between the video signal and the audio signal according to the selected bitrate allocation candidate includes setting a bitrate value for the video signal to a video bitrate value reflected in the representation of the selected bitrate allocation candidate and setting a bitrate value for the audio signal to an audio bitrate value reflected in the representation of the selected bitrate allocation candidate.

Some or all of the operations of the technique 800 can be repeated, such as to adapt the bitrate allocations to available client resources over time during playback of the immersive multimedia item. For example, the bitrate candidates available based on a client profile can initially be determined based on a selection received from a user of the client to which the immersive multimedia item is streamed (e.g., by such user selecting a resolution for the streaming from a list of available resolutions). Over time, the operations for determining the bitrate candidates, selecting the optimal bitrate candidate, and adjusting the bitrate allocations between the signals of the immersive multimedia item may be repeated. For example, where a better option for streaming the immersive multimedia item to the client becomes available (e.g., where the bandwidth available supports a higher resolution than currently used), the streaming can be scaled to such better option.

In some implementations, the operations for determining the bitrate candidates may be combined with the operations for producing the client profile. For example, producing the client profile can include determining the bitrate candidates that are available for streaming the immersive multimedia item based on the quality selection reflected in the client profile.

Figure 9:
FIG. 9 is an illustration of examples of representations of an immersive multimedia item.
Figure 9:
Figure 9:
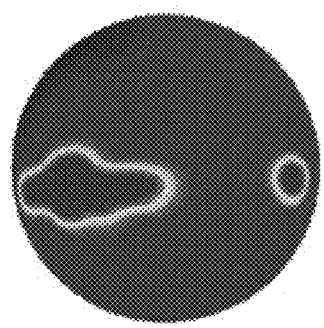

FIG. 9 is an illustration of examples of representations of an immersive multimedia item. As described above, media signals of an immersive multimedia item may be represented by translating data from a spherical representation. For example, the immersive multimedia item may include a video signal and an audio signal, both of which may be represented based on data within the spherical representation. The video signal may be represented as a spherical video representation 900 by parameterizing portions of a sphere onto a two-dimensional plane, such as to produce or otherwise render an equirectangular projection 902. Three-dimensional coordinates within the spherical representation can be mapped to a two-dimensional plane using the following equation:

$$f(\Phi,\theta)=\{x=\sin(\Phi)\cos(\theta); y=\sin(\Phi)\sin(\theta); z=\cos(\Phi)\} \quad \text{(Equation 7)}$$

where $(\Phi, \theta)$ represents the two-dimensional angular parameters. The audio signal may be represented as a spherical audio representation 904 using an ambisonics technique for modeling spatial audio. The ambisonics technique may, for example, model sound pressure within the sphere using spherical harmonics basis functions of a fixed order. The spherical harmonics basis functions have global support over the sphere. For example, a first order approximation can use four audio channels to determine a course approximation of the sound field. In another example, a third order approximation can use sixteen audio channels, resulting in potentially higher spatial acuity.

In some implementations, the video signal may be parameterized onto a two-dimensional plane other than an equirectangular projection. For example, the video signal may be parameterized onto a cube map projection or other map projection. In some implementations, the audio signal may include non-diegetic audio. Non-diegetic audio refers to audio content that is not directly associated with a corresponding visual source. Non-diegetic audio may use two extra audio channels. For example, a third order approximation for ambisonics modeling of the audio signal may use eighteen audio channels.

In some implementations, one or both of the video signal or the audio signal of an immersive multimedia item may exist in an object-based representation. For example, a technique for adjusting allocations of bitrate based on saliencies of the video signal, the audio signal, or both (e.g., the technique 600 shown in FIG. 6), may be performed by first converting both audio and video to a common saliency map representation in which an audio saliency map and a video saliency map can be combined to produce a fused saliency map. For example, an object-based audio representation can be converted to an ambisonics representation, which may then be converted to an equirectangular saliency map of audio signal changes over a 360 degree space of the immersive multimedia item. Similarly, an object-based video representation can be converted to an equirectangular saliency map of video signal changes over a 360 degree space of the immersive multimedia item.

Figure 10:
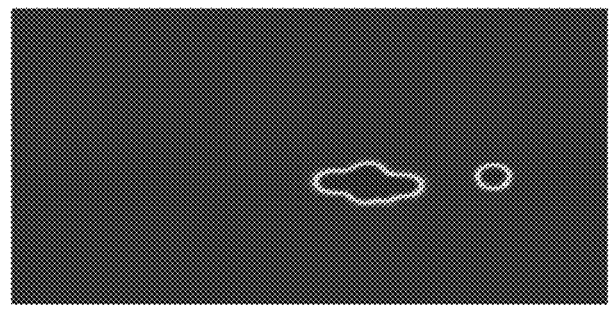
FIG. 10 is an illustration of examples of saliency maps produced for an immersive multimedia item.
Figure 10:
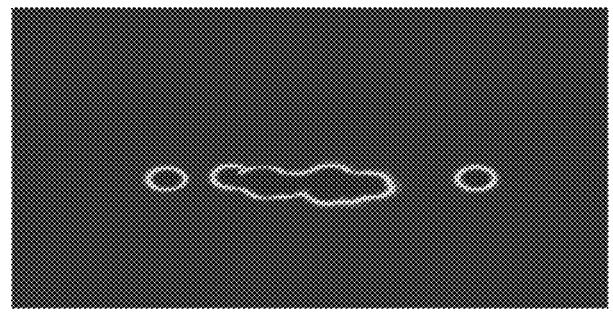
Figure 10:
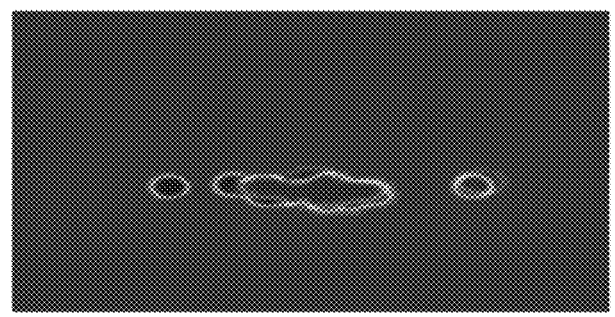

FIG. 10 is an illustration of examples of saliency maps produced for an immersive multimedia item. An audio saliency map 1000 may be produced based on changes in an audio signal of the immersive multimedia item. The changes may reflect changes in one or more of loudness coming from a particular direction within the immersive multimedia item environment, a class of sound content presented at a particular time during the playing of the immersive multimedia item, or the like. A video saliency map 1002 may be produced based on renderings of multiple viewports of the immersive multimedia item, such as with reference to changes in a video signal or otherwise in visual content within such viewports. A fused saliency map 1004 may then be produced by combining the audio saliency map 1000 and the video saliency map 1002, for example, using a parameterized model for mixing the relative importance of the audio and video signals of the immersive multimedia item.

Figure 11:
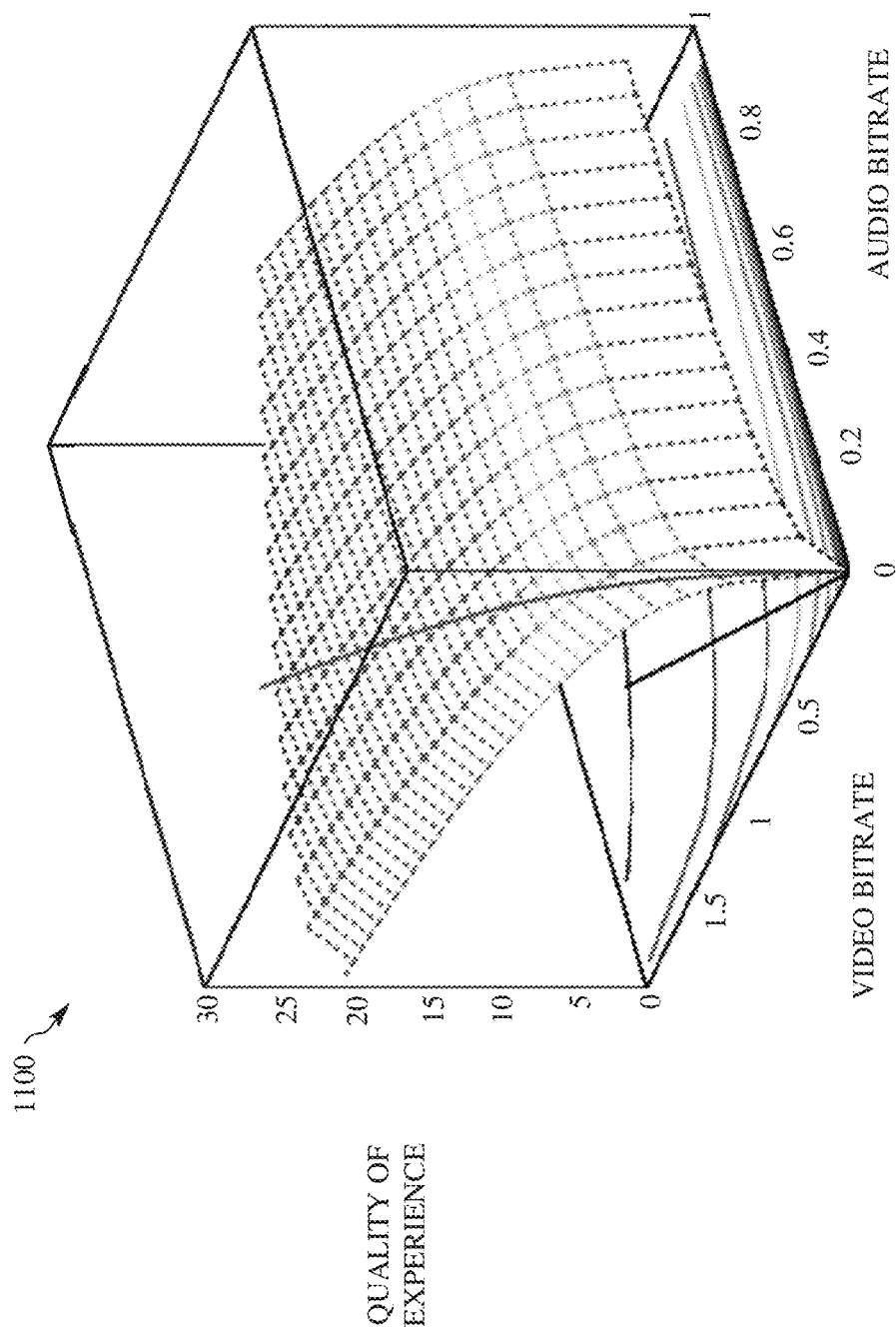
FIG. 11 is an illustration of an example of a graph showing changes to a quality of experience for an immersive multimedia item based on a video bitrate and an audio bitrate.

FIG. 11 is an illustration of an example of a graph 1100 showing changes in a QoE for an immersive multimedia item based on a video bitrate and an audio bitrate. The graph 1100 represents a single audio and video representation and all possible bitrates that could be allocated to it. As shown by the curves of the graph 1100, for a fixed bitrate, adding audio will likely improve the overall QoE for the single audio and video representation. However, eliminating the video signal to optimize the audio signal will likely result in a lower QoE.

Figure 12:
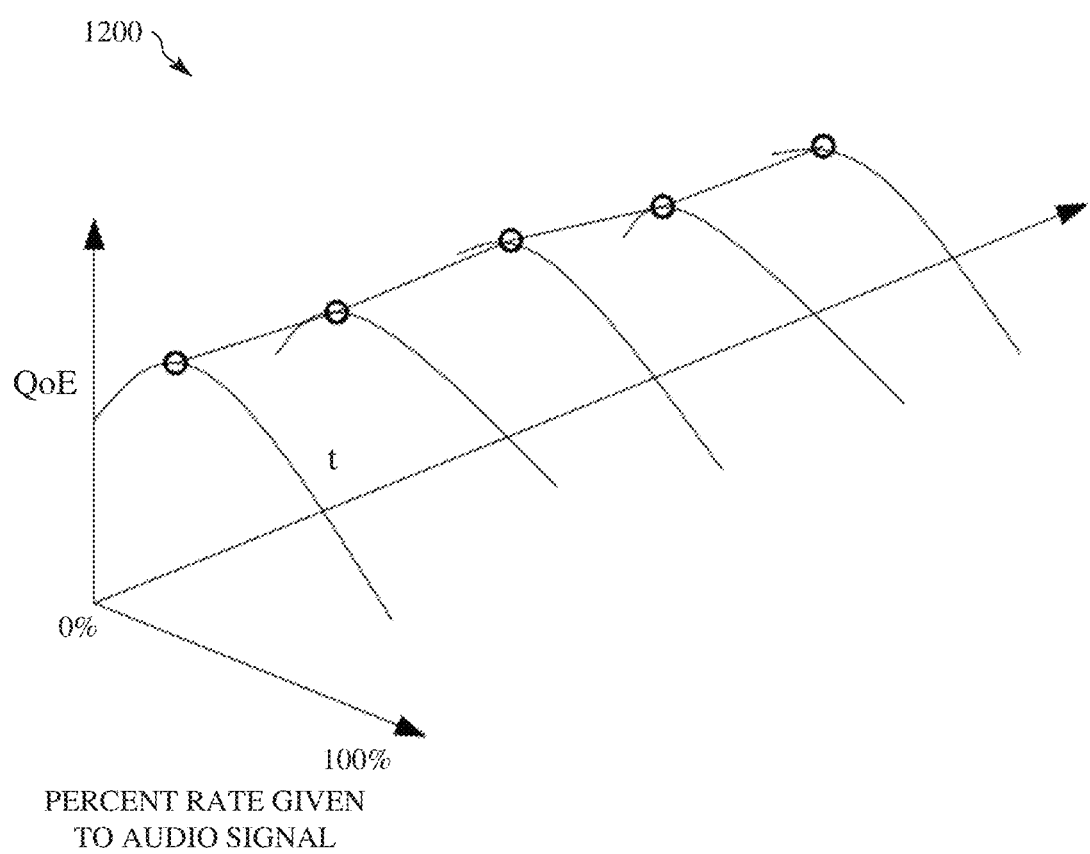
FIG. 12 is an illustration of an example of a graph showing changes in optimizations for bitrates allocated to video and audio over time.

FIG. 12 is an illustration of an example of a graph 1200 showing changes in optimizations for bitrates allocated to video and audio over time. In particular, the graph 1200 presents one model of changes in the amount of bitrate allocated for an audio signal of a given audio and video representation of an immersive multimedia item over time. A fixed bitrate may be used for audio and video signals of an immersive multimedia item. In such a case, the relative proportion of that bitrate that is allocated to each of the audio and video signals to optimize the overall quality of experience for the immersive multimedia item may vary. This variance may be based on the features of the immersive multimedia item and the experience of the user in viewing the immersive multimedia item. As such, in selecting the audio bitrate and the video bitrate for a given audio and video representation of an immersive multimedia item, the trade-off between audio and video over time during the playing of the immersive multimedia item is considered.

The word "example" is used herein to mean serving as an example, instance, or illustration. An aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean a natural inclusive permutation thereof. That is, if X includes A; X includes B; or X includes both A and B, then "X includes A or B" is satisfied under one or more of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the clients and servers described herein (and the functionality thereof) can be realized in hardware, software, or a combination thereof. The hardware can include, for example, computers, intellectual property (IP) cores, ASICs, programmable logic arrays, optical processors, programmable logic controllers, microcode, microcontrollers, servers, microprocessors, digital signal processors, or another suitable circuit. In the claims, the term "processor" should be understood as encompassing ones of the foregoing hardware, either singly or in combination. The terms "signal" and "data" are used interchangeably. Further, portions of the clients and servers do not necessarily have to be implemented in the same manner.

Further, in one aspect, for example, the clients or the servers described herein can be implemented using a general purpose computer or general purpose processor with a computer program that, when executed, carries out ones of the respective techniques, methods, algorithms, and/or instructions described herein. In addition, or alternatively, for example, a special purpose computer/processor can be utilized which can contain other hardware for carrying out ones of the techniques, methods, algorithms, or instructions described herein.

Further, all or a portion of implementations of the present disclosure can take the form of a computer program product accessible from, for example, a computer-usable or computer-readable medium. A computer-usable or computer-readable medium can be a device that can, for example, tangibly contain, store, communicate, or transport the program for use by or in connection with a processor. The medium can be, for example, an electronic, magnetic, optical, electromagnetic, or semiconductor device. Other suitable mediums are also available.

The above-described implementations and examples have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for adjusting allocations of bitrate between a video signal and an audio signal of an immersive multimedia item, the method comprising:

identifying content of interest within a time interval of the immersive multimedia item, wherein the content of interest includes video content of the video signal within the time interval, audio content of the audio signal within the time interval, or both the video content of the video signal and the audio content of the audio signal within the time interval;

identifying an amount of bandwidth available for transmitting the video signal and the audio signal to a client during the time interval;

selecting, from a set of bitrate candidates that is limited by the amount of bandwidth, a bitrate candidate reflecting bitrates for the video signal and for the audio signal based on the content of interest, wherein a respective bitrate candidate of the set of bitrate candidates reflects a different combination of bitrates for the video signal and for the audio signal, and wherein a respective bitrate candidate is determined by jointly processing the video signal and the audio signal to improve an overall quality of experience (QoE) metric for the immersive multimedia item as compared to the overall QoE metric resulting from processing the video signal and the audio signal separately; and adjusting the allocations of the bitrate between the video signal and the audio signal according to the selected bitrate candidate.

2. The method of claim 1, wherein the content of interest includes only the video content and the bitrates reflected by the selected bitrate candidate indicate to allocate more bitrate to the video signal than to the audio signal.

3. The method of claim 1, wherein a different bitrate candidate is selected based on content of interest within a subsequent time interval of the immersive multimedia item and the method comprises:

subsequent to adjusting the allocations of the bitrate between the video signal and the audio signal according to the selected bitrate candidate, readjusting the allocations of the bitrate between the video signal and the audio signal according to the different bitrate candidate.

4. The method of claim 1, wherein identifying the amount of bandwidth comprises determining the amount of bandwidth based on statistical information.

5. The method of claim 4, wherein the statistical information indicates an average amount of bandwidth available to clients to which the immersive multimedia item can be streamed.

6. The method of claim 1, wherein a respective bitrate candidate of the set of bitrate candidates reflects a different quality measurement for each of the video signal and the audio signal.

7. The method of claim 1, comprising:

receiving a quality selection, the quality selection including indicating preferences of a user of a client to which the immersive multimedia item is streamed, wherein at least some bitrate candidates of the set of bitrate candidates are based on the quality selection.

8. The method of claim 7, wherein the quality selection comprises a resolution for the immersive multimedia item.

9. The method of claim 1, wherein at least some of the set of bitrate candidates reflect different numbers of channels for the audio signal.

10. The method of claim 1, further comprising:

parameterizing the audio signal in a direction of a spherical representation of the immersive multimedia item to identify changes in loudness of audio content of the immersive multimedia item.

11. An apparatus for adjusting allocations of bitrate between a video signal and an audio signal of an immersive multimedia item, the apparatus comprising:

a processor configured to:

identify content of interest within a time interval of the immersive multimedia item, wherein the content of interest includes video content of the video signal within the time interval, audio content of the audio signal within the time interval, or both the video content of the video signal and the audio content of the audio signal within the time interval;

identify an amount of bandwidth available for transmitting the video signal and the audio signal to a client during the time interval;

select, from a set of bitrate candidates that is limited by the amount of bandwidth, a bitrate candidate reflecting bitrates for the video signal and for the audio signal based on the content of interest, wherein a respective bitrate candidate of the set of bitrate candidates reflects a different combination of bitrates for the video signal and for the audio signal, and wherein a respective bitrate candidate is determined by jointly processing the video signal and the audio signal to improve an overall quality of experience (QoE) metric for the immersive multimedia item as compared to the overall QoE metric resulting from processing the video signal and the audio signal separately; and adjust the allocations of the bitrate between the video signal and the audio signal according to the selected bitrate candidate.

12. The apparatus of claim 11, wherein the content of interest includes only the audio content and the bitrates reflected by the selected bitrate candidate indicate to allocate more bitrate to the audio signal than to the video signal.

13. The apparatus of claim 11, wherein to identify the amount of bandwidth comprises to examine network traffic information established between a client and a server from which the immersive multimedia item is streamed.

14. The apparatus of claim 11, wherein the processor is configured to compare bitrate candidates of the set of bitrate candidates, and to select the bitrate candidate comprises to select the bitrate candidate based on a result of the comparing.

15. The apparatus of claim 14, wherein to compare the bitrate candidates comprises to compare results of a rate-distortion analysis, and to select the bitrate candidate comprises to select the bitrate candidate as the one of the set of bitrate candidates having a best score from the rate-distortion analysis.

16. The apparatus of claim 11, wherein to select the bitrate candidate comprises to select the bitrate candidate of the set of bitrate candidates that maximizes the overall QoE metric for the immersive multimedia item.

17. The apparatus of claim 11, wherein the processor is configured to:

determine the set of bitrate candidates.

18. The apparatus of claim 17, wherein to determine the set of bitrate candidates comprises to determine the set of bitrate candidates to meet preferences included in a client profile.

19. The apparatus of claim 11, wherein to identify the content of interest comprises to:

produce a video saliency map representing changes in the video signal over the time interval within a spatial region of the immersive multimedia item; and produce an audio saliency map representing changes in the audio signal over the time interval within the spatial region, wherein at least one of the changes in the video signal or the changes in the audio signal reflect the content of interest.

20. The apparatus of claim 19, wherein the processor is configured to:

combine at least a portion of the video saliency map and at least a portion of the audio saliency map to produce a fused saliency map, wherein to combine includes to adjust relative weights of the audio saliency map and of the video saliency map and to adjust the allocations of the bitrate comprises to enhance the content of interest according to the fused saliency map.

* * * * *